United States Patent [19]

Watkins

[11] Patent Number: 4,731,810

[45] Date of Patent: Mar. 15, 1988

[54] NEIGHBORHOOD HOME SECURITY SYSTEM

[76] Inventor: Randy W. Watkins, 7343 Satsuma Ave., Sun Valley, Calif. 91352

[21] Appl. No.: 832,697

[22] Filed: Feb. 25, 1986

[51] Int. Cl.[4] .......................................... H04M 11/04
[52] U.S. Cl. ........................................ 379/33; 379/40; 379/44; 340/538; 340/310 A
[58] Field of Search ................... 179/2 A, 2.51, 5 R, 179/5 P, 27 G; 340/310 A, 310 R, 538; 379/32, 33, 37, 39, 40, 41, 44, 50, 51, 66, 106

[56] References Cited

U.S. PATENT DOCUMENTS

| | | |
|---|---|---|
| 3,388,389 | 6/1968 | Henriques . |
| 3,852,740 | 12/1974 | Haymes ............................. 340/538 |
| 3,925,763 | 12/1975 | Wadhwani et al. ......... 340/310 A X |
| 4,119,815 | 10/1978 | Frankfort et al. ................... 379/216 |
| 4,148,020 | 4/1979 | Seimer et al. ................... 340/538 X |
| 4,361,730 | 11/1982 | Barber et al. ..................... 379/40 X |
| 4,361,832 | 11/1982 | Cole ................................. 379/50 X |
| 4,465,904 | 8/1984 | Gottsegen et al. ................... 379/27 |

FOREIGN PATENT DOCUMENTS 60-247365 12/1985 Japan ..................... 379/33
2151116 7/1985 United Kingdom ........... 340/310 A

*Primary Examiner*—Keith George
*Attorney, Agent, or Firm*—John T. Matlago

[57] ABSTRACT

A backup security system for the telephone company lines of a protected home located in a neighborhood in which all the homes have a.c. supply lines connected to a common power transformer. The protected home, in addition to being provided with a conventional security system, is provided with a line-cut monitor, a PWM transmitter, and a conflict avoidance circuit. When the line-cut monitor senses that the telephone company lines for the protected home have been cut by an intruder, it provided a signal for gating an alarm signal from the conventional security system to the PWM transmitter which impresses the alarm signal as high frequency signals on the a.c. supply lines in the neighborhood. A neighboring home in the neighborhood is provided with a PWM receiver, telephone company lines and an automatic telephone communicator. The PWM receiver in the neighboring home responds to the high frequency signals on the a.c. supply lines and provides a digital signal to the automatic telephone communicator causing it to seize the telephone company lines for the neighboring home and send a message informing a central station that an intruder has broken into the protected home. The conflict avoidance circuit in the protected home enables the PWM transmitter therein to impress high frequency signals on the a.c. supply lines in the neighborhood only when there is an absence of any other high frequency signals on the a.c. supply lines in the neighborhood.

9 Claims, 7 Drawing Figures

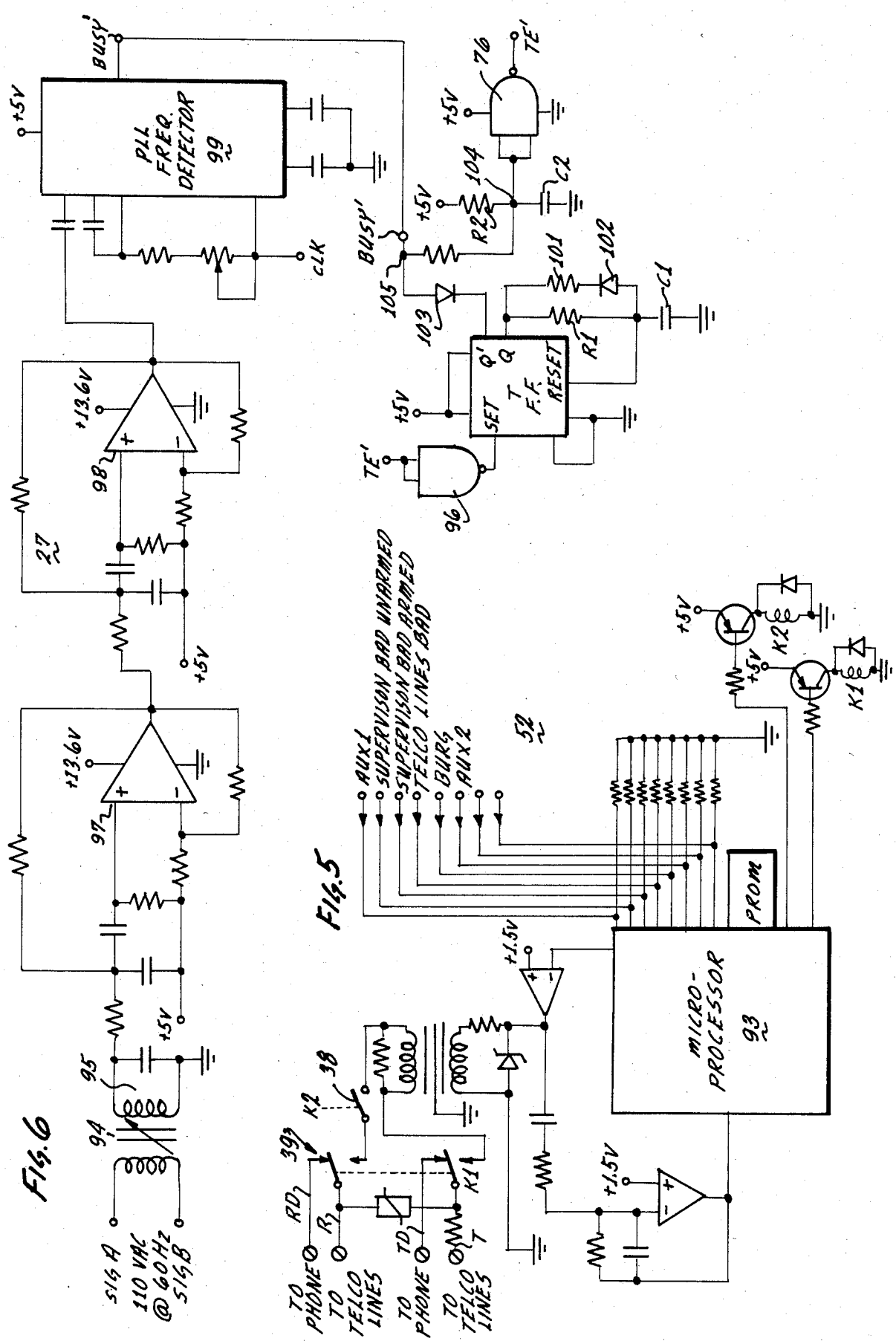

NEIGHBORHOOD HOME SECURITY SYSTEM

BACKGROUND AND SUMMARY OF THE INVENTION

This invention relates to home security systems and more particularly to a home security system that provides for using the telephone company lines in a neighbor's home to send out messages for emergency services in the event that telephone company lines for the protected home have been cut by an intruder.

It is well known to provide a security system in a home where when a sensor detects that a door or window in the home has been opened by an intruder a signal will be conveyed to an alarm panel in the home causing an automatic telephone communicator (ATC) to seize the telephone company lines leading out of the home and send a message to a central station advising of the intrusion.

The problem with such a conventional security system is that when an intruder intends to break into a home he may first cut the telephone company lines connected to the telephone in the home thereby preventing the automatic telephone communicator in the home from sending out a message through the telephone for emergency assistance.

Now it is well known that all the homes in a particular neighborhood are serviced by a.c. supply lines connected to a common secondary winding of a power transformer. As a result, when a high frequency electrical signal is impressed on the outlet of the a.c. supply lines provided in one of the homes, these signals are transmitted along the a.c. supply lines to outlets provided in each of the other homes in the neighborhood.

Thus, in accordance with the present invention, in addition to the conventional security system in a protected home, a line-cut monitor is provided which is connected across the telephone company lines extending into the protected home and a pulse width modulator (PWM) transmitter is provided which is coupled to the a.c. supply in the protected home. Thus, in the event that the telephone company lines outside the protected home are cut, the PWM transmitter responds to a signal received from the alarm panel of the conventional security system and/or emergency panic buttons in the protected home and provides for transmitting this data in the form of modulated high frequency signals over the a.c. supply lines to a PWM receiver provided in a selected one of the neighbor's homes in the neighborhood. This data upon being received in the selected neighbor's home is utilized to activate an automatic telephone communicator (ATC) therein which seizes the telephone company lines connected to the telephone in the selected neighbor's home and sends out a prerecorded or coded message indicating the nature of the emergency to the central station.

Accordingly, one of the objects of the present invention is to provide a security system for a protected home that makes use of a neighbor's telephone company lines to send signals regarding emergencies to a central station in the event the telephone company lines at the protected home have been cut by an intruder.

Another object of the present invention is to provide for sending information to a central station as to whether a security system at a protected home is armed or unarmed so that the likelihood of whether a burglary is in progress can be more readily determined by an operator at the central station.

Yet another object of the present invention is to provide a conflict avoidance circuit coupled to a PWM transmitter in a protected home which prevents the PWM transmitter from impressing high frequency signals on the a.c. supply lines in the neighborhood until the conflict avoidance circuit detects the absence of any high frequency signals on the a.c. supply lines.

These and other objects and features of the present invention will be apparent through a consideration of the following description when viewed in the light of the accompanying drawings which show an exemplary schematic diagram of a preferred embodiment of the invention.

BRIEF DESCRIPTION OF THE DRAWINGS

FIG. 5 is a schematic diagram of an automatic telephone communicator as provided in the neighbor's home;

FIG. 6 is a schematic diagram of a conflict avoidance circuit as provided in the protected home.

DESCRIPTION OF THE PREFERRED EMBODIMENT

Figure 1:
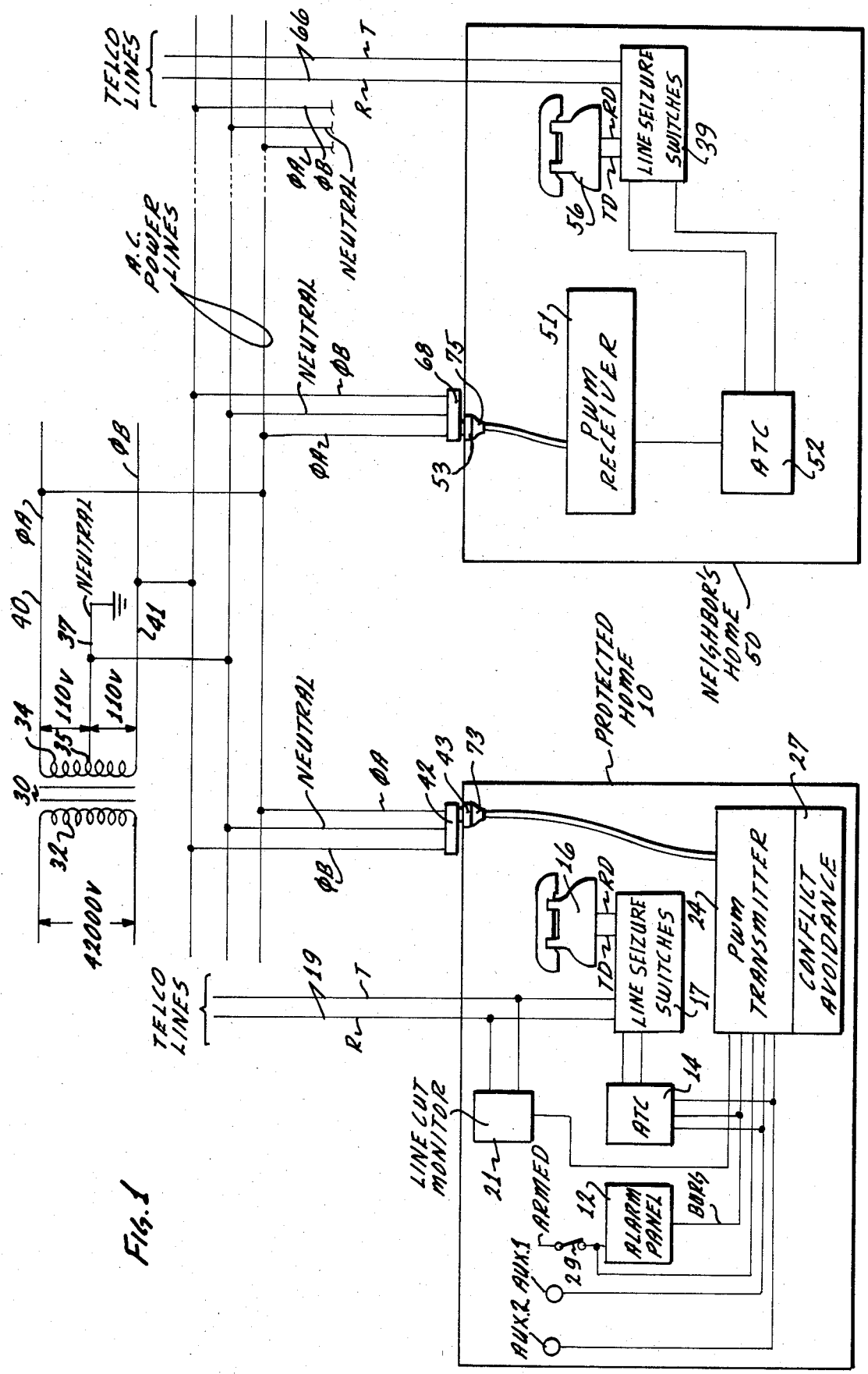
FIG. 1 is a diagram illustrating the overall security system of the present invention.

Reference will first be made to FIG. 1 which illustrates the overall system of the present invention. As shown, a protected home 10 is provided with a conventional security system which includes an alarm panel 12, emergency panic buttons AUX. 1 and AUX. 2, and an automatic telephone communicator (ATC) 14. Although not shown, each of these units of the conventional security system is powered by a.c. current as supplied to the home through a breaker switch 42. The alarm panel 12 when armed by the closing of switch 29 and each of the panic buttons AUX. 1 and AUX. 2 are able to send a signal to the ATC 14 in the event of an emergency situation which operates to seize the telephone 16 in the protected home 10 by use of line seizure switches 17 and send prerecorded or coded messages via the telephone company lines (TELCO) 19 to a central station regarding the fact that a burglary is in progress or that there is a fire or medical emergency situation, for example, requiring immediate attention.

When a conventional security system, as above described is used in a protected home 10, a burglar about to intrude into the protected home, may first cut the telephone company lines 19 leading from a telephone pole (not shown) into the protected home 10, thereby preventing the security system therein from sending a message over the telephone company lines 19 to the central station to advise of the intrusion.

As illustrated in FIG. 1, each of the homes in a particular neighborhood is wired to be supplied with a.c. power as provided from a common power transformer 30. The transformer 30 typically has a high voltage of 42,000 volts across the primary winding 32 thereof and a voltage of 220 volts across the secondary winding 34 thereof. A grounded neutral line 37 is connected to the center tap 35 of the secondary winding 34, a φA supply line 40 is connected to one end of the secondary winding 34, and a φB supply line 41 is connected to the other end of the secondary winding 34. Thus 60 Hz 110 VAC of φA power is provided across the lines 40 and 37 and 60 Hz 110 VAC of φB power is provided across lines 41 and 37. Such a circuit arrangement is provided because most appliances in the home take 110 volts a.c. from either φA or φB.

As shown in FIG. 1, the 60 Hz φA is connected through a circuit breaker 42 to an outlet 43 in the protected home 10 and also connected through a circuit breaker 68 to an outlet 53 in a selected neighbor's home 50. Although only two homes are illustrated in FIG. 1, it should be appreciated that as many as 20 or more homes in a neighborhood could all be connected to receive a.c. current from transformer 30.

Now it is well known that the 60 Hz 110 VAC on these a.c. supply lines can be used as a carrier for high frequency electrical signals impressed on the a.c. supply outlet provided at one of the homes and when so impressed the high frequency electrical signals will be received at the a.c. supply outlet in each of the other homes in the neighborhood. Even if the high frequency electrical signals impressed on the 60 Hz 110 VAC of φA on supply lines 40 and 37 at a protected home were to travel through the secondary winding 34 of the transformer 30 and come into a neighbor's home by way of the φB on supply lines 41 and 37, they would still be able to be received at the selected neighbor's home. Of course, since the power transformer 30 is turned to be most efficient for the 60 Hz current, the high frequency electrical signals on the order of 400 KHz would have much more insertion loss when they go through the secondary winding 34 of the power transformer 30. Moreover, the high frequency electrical signals experience a lot of loss by having to be driven along the long lines extending from a protected home to the selected one of the neighbor's home being used as the backup. However, these losses present no problem since it is possible to detect as little as 10 mv on the a.c. supply lines at a neighbor's home.

Thus, in view of the above, and in accordance with the present invention, the protected home 10, in addition to being provided with units of a conventional security system, is also provided with a line-cut monitor 21, a PWM transmitter 24 and a conflict avoidance circuit 27. Moreover, the selected neighbor's home 50 whose telephone 56 is to be used as a backup for the telephone 16 in the protected home 10 is provided with a PWM receiver 51 and an automatic telephone communicator 52.

Now, although, as above described, all homes in a particular neighborhood share a.c. power lines supplied by the secondary winding 34 of the common power transformer 30, each of the homes in the neighborhood has a separate set of outside telephone company lines (TELCO) that lead from a telephone pole to each of the homes. Thus the subscriber or protected home 10 has a set of outside R and T telephone company lines 19 and the neighbor's home 50 has a set of outside R and T telephone company lines 66.

It should now be understood that when the set of R and T outside telephone company lines 19 connected to the protected home 10 are cut by an intruder, the line-cut monitor 21 connected across these telephone company lines 19 detects this condition and provides a signal which is fed into the PWM transmitter 24 and is also used for gating (FIG. 2) a subsequent signal from the alarm panel 12 indicative of a burglary (BURG), and/or signals from emergency panic buttons AUX. 1 and AUX. 2 into the PWM transmitter 24. The panic buttons AUX. 1 and AUX. 2 are actuated manually by someone in the protected home generally just after the intruder walks in, and serve to summon the police or report a medical emergency, for example. In addition, information as to whether the conventional burglary system in the home 10 has been armed or not by the owner closing switch 29 when he left home is also sensed at the input to the PWM transmitter 24.

It should now be clearly understood that the PWM transmitter 24 in the protected home will only be used to impress alarm information in the form of high frequency electrical signals on the a.c. supply lines in the neighborhood if the set of telephone company lines 19 outside the home 10 being protected has been cut or rendered inoperable for some other reason. Otherwise, the telephone 16 at the protected home 10 will be controlled by the ATC 14 located in the protected home 10 to send its own prerecorded or coded messages over its own local telephone company lines 19 to the central station regarding a burglary or emergency as evidenced by the depressing of the panic buttons AUX. 1 or AUX. 2.

As will be described hereinafter, the conflict avoidance circuit 27 associated with the PWM transmitter 24 in the protected home 10 provides for making sure that the a.c. supply lines are not being used to send signals from other PWM transmitters in the neighborhood before it permits the PWM transmitter 24 to send its signal information over the a.c. supply lines for receipt at the neighbor's home 50.

Still referring to FIG. 1, upon the neighbor's home 50 receiving in its PWM receiver 51 the alarm signals being transmitted by the PWM transmitter 24 in the protected home 10, it sends signals to the ATC 52 therein which seizes telephone company lines 66 by use of the line seizure switches 39 and sends out a prerecorded or coded message to the central station. It is necessary to seize the telephone company lines since the neighbor may be on the telephone at the time not realizing that a burglary, for example, is in progress at the protected home 10. The prerecorded or coded message that is sent out by the ATC 52 in the neighbor's home may report the fact that the TELCO lines in the protected home 10 have been cut, i.e., are bad, whether the protected home 10 is armed or not, whether a subsequent burglary (BURG) is taking place or not, or whether panic buttons AUX. 1 or AUX. 2 have been subsequently depressed or not.

In summary, it should now be clear that if the main subscriber in the protected home 10 has his telephone company lines 19 cut, or otherwise rendered inoperable, this information will be transmitted to the neighbor's home 50 via the a.c. supply lines. Moreover, if there is a subsequent burglary, for example, that information will also be transmitted to the neighbor's home 50 via the a.c. supply lines causing the ATC 52 at the neighbor's home 50 to connect by use of the line seizure switches 39 to the telephone company lines 66 of the telephone 56 and dial out a message to the central station advising of the burglary. In other words, the home security system of the present invention is, in effect, watching to see if the telephone 16 in the protected home 10 gets rendered inoperable, and, if so, employs the telephone company lines 66 of the telephone 56 in the neighbor's home 50 as a backup.

Figure 2:
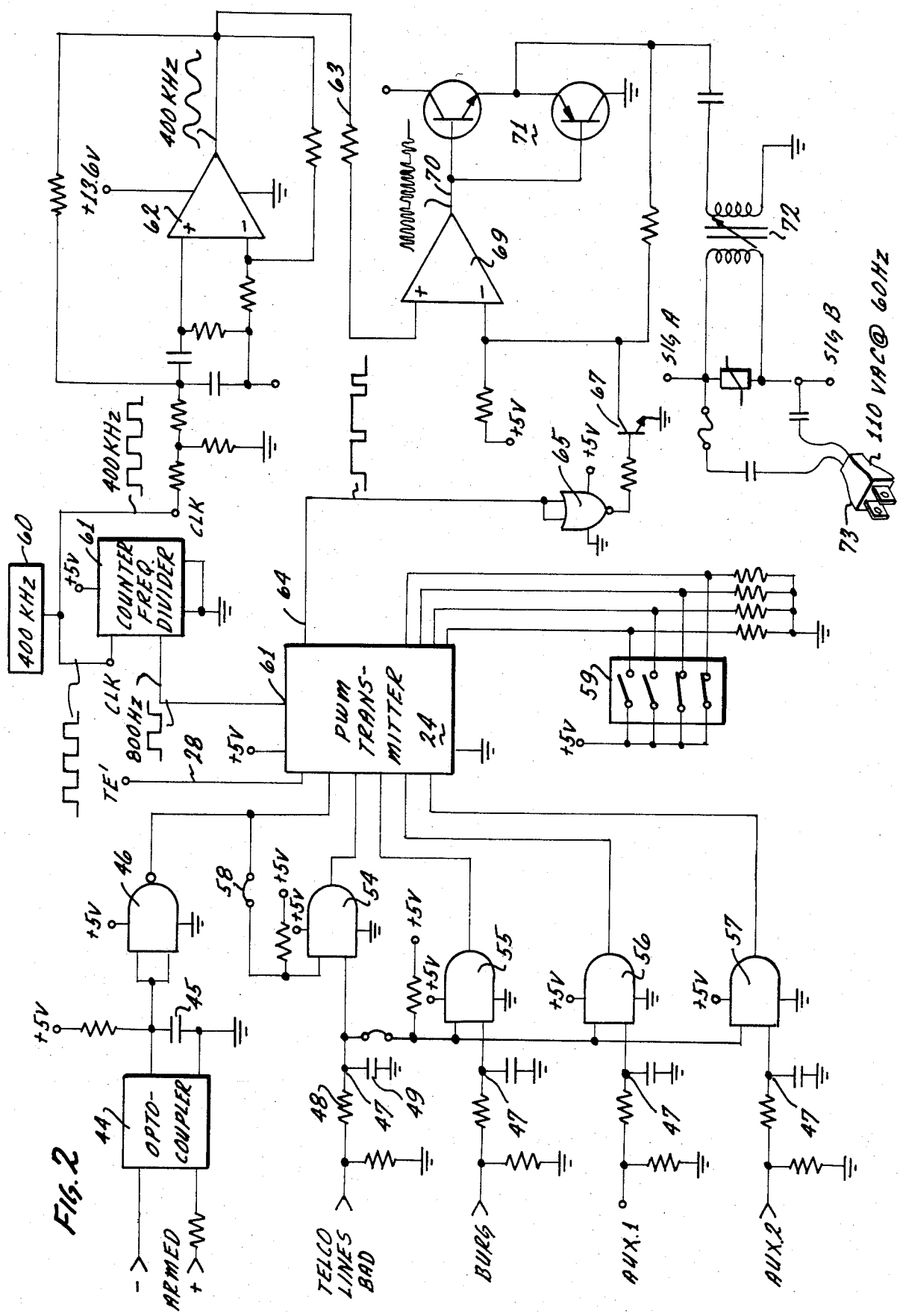
FIG. 2 is a schematic diagram of a PWM transmitter and associated circuits as provided in a protected home.

Reference will next be made to FIG. 2 which is a schematic block diagram of the PWM transmitter 24 in the protected home 10. The PWM transmitter 24 is provided with five data inputs from the security system, namely, ARMED, TELCO LINES BAD, BURG, AUX. 1 and AUX. 2. The ARMED input is sensed by an optocoupler 44. Thus when the security system in the protected home 10 is armed by the closing of switch 29 by the owner when he leaves the premises, an ARMED high voltage level signal is sensed and provides for discharging a capacitor 45 to provide a low voltage level signal to the input of an inverter 46 whose high voltage level output is then fed to an input of the PWM transmitter 24.

Each of the remaining four inputs to the PWM transmitter 24, namely, TELCO LINES BAD, BURG, AUX. 1 and AUX. 2, is first fed via a protection network 47, comprised of a resistor 48 and a capacitor 49, into one input of each of the AND gates 54, 55, 56 and 57, respectively. These protection networks 47 make sure that any static charge on these inputs is dissipated so as to prevent erroneous signals on the inputs to the AND gates. The ARMED output of inverter 46 is fed by a jumper 58 into the other input of AND gate 54. Thus the TELCO LINES BAD signal indicative of the telephone company lines being cut may or may not be fed into the PWM transmitter 24, when the security system in the protected home 10 is unarmed.

The line-cut monitor 21 provides a high voltage level signal if the telephone company lines 19 have been cut otherwise the signal is at a low voltage level. Thus, the TELCO LINES BAD signal is fed into the other input of each of the AND gates 55, 56 and 57 and provides for BURG, AUX.1 and AUX. 2 inputs to be gated into the PWM transmitter 24 only when the telephone company lines 19 have been cut. The BURG signal comes from the alarm panel 12 of the protected home conventional security system, while the AUX. 1 and AUX. 2 inputs are independent panic buttons, for use in calling the police or medical aid, for example, and they operate to provide gated inputs to the PWM transmitter 24 irrespective of whether the security system of the subscriber's home. i.e., the protected home, is armed or unarmed.

A set of switches 59 associated with the PWM transmitter 24 is manually set to indicate the address assigned to the PWM transmitter 24 in the protected home 10. The binary outputs of these switches 59 are fed into the PWM transmitter 24.

A timing pulse source 60 operating at 400 KHz provides square wave clock pulses. These clock pulses are fed into a frequency divider 61 to provide square wave clock pulses of 800 Hz to operate the PWM transmitter 24.

The 400 KHz square wave pulses are also fed into a band pass filter 62 having a high Q which serves to convert the 400 KHZ input square waves to 400 KHz output sinewaves on line 63.

Figure 3:
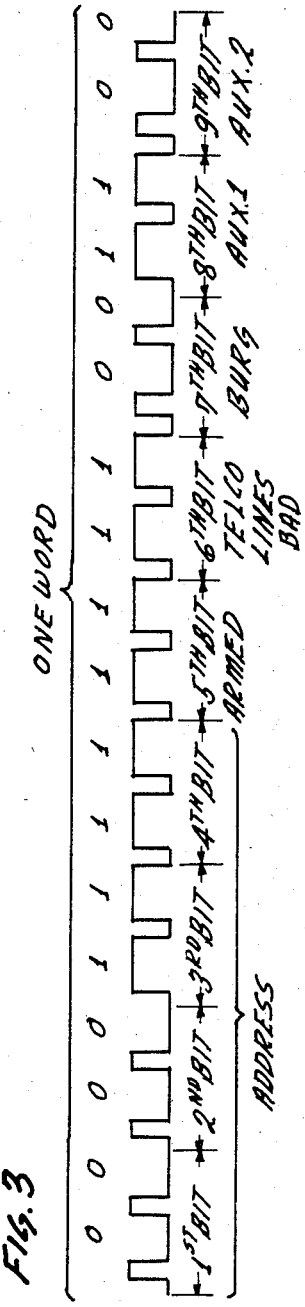
FIG. 3 illustrates the waveforms of a word of digital bits as generated by the PWM transmitter.

As shown in FIG. 3, the 4-bit address setup in the manually set address switches 59 together with the five 1-bit data inputs to the PWM transmitter 24 are each given a predetermined location in the 9-bit serial digital word provided on the output 64 of the PWM transmitter 24. As noted the digital waveform provided for a binary 1 bit in the digital word is a wide high level voltage pulse and the digital waveform provided for a binary 0 bit is a narrow high level voltage pulse. Moreover, the binary bit in each bit location of the word is duplicated for accuracy in transmission. Thus, as shown in FIG. 3, the first bit, second bit, third bit and fourth bit of the serial digital word comprises the 4-bit address of the PWM transmitter 24 as set up in the manual switches 59, the fifth bit (ARMED) is indicative of whether the security system is armed or not, the sixth bit (TELCO LINES BAD) is indicative of whether the set of telephone lines 19 has been cut or not, the seventh bit (BURG) is indicative of whether a burglary is in progress or not, the eighth bit (AUX. 1) is indicative of whether the AUX. 1 panic button which may be used for calling the police, for example, has been depressed or not, and the ninth bit (AUX. 2) is indicative of whether the AUX. 2 panic button which may be used for calling for medical aid, for example, has been depressed or not. In any event the PWM transmitter 24 responds to the signals at each of its inputs to provide the serial 9-bit digital word, shown in FIG. 3, at its output 64.

Referring back to FIG. 2, the digital word provided on the output 64 of the PWM transmitter 24 is fed into an inverter 65 whose output when at a high voltage level turns on an npn transistor 67 so as to ground the minus input of an operational amplifier 69. The plus input of operational amplifier 69 is connected to receive the 400 KHz sinewave on line 63. Thus when a data out bit on line 64 from PWM transmitter 24 is a wide or narrow high voltage pulse indicative of a binary 1 or 0 digit, respectively, a wide or narrow burst of 400 KHz sinewaves is present on the output 70 of the operational amplifier 69. This PWM 400 KHz sinewave train is fed to a power amplifier 71 which amplifies its current and couples it through an output transformer 72 to a wall plug 73 which is connected to the a.c. supply wall outlet 43 in the protected home 10. Thus the PWM 400 KHz sinewave train form of the 9-bit digital word is superimposed on the 60 Hz current in the a.c. power lines 40 and 37 and thus carried thereby to each of the homes in the neighborhood. As will be further discussed hereinafter the PWM transmitter 24 operates to impress its PWM 400 KHz sinewave train on the a.c. supply lines in the neighborhood at successive 5 second intervals, unless momentarily held up from doing so by its conflict avoidance circuit 27.

Figure 4:
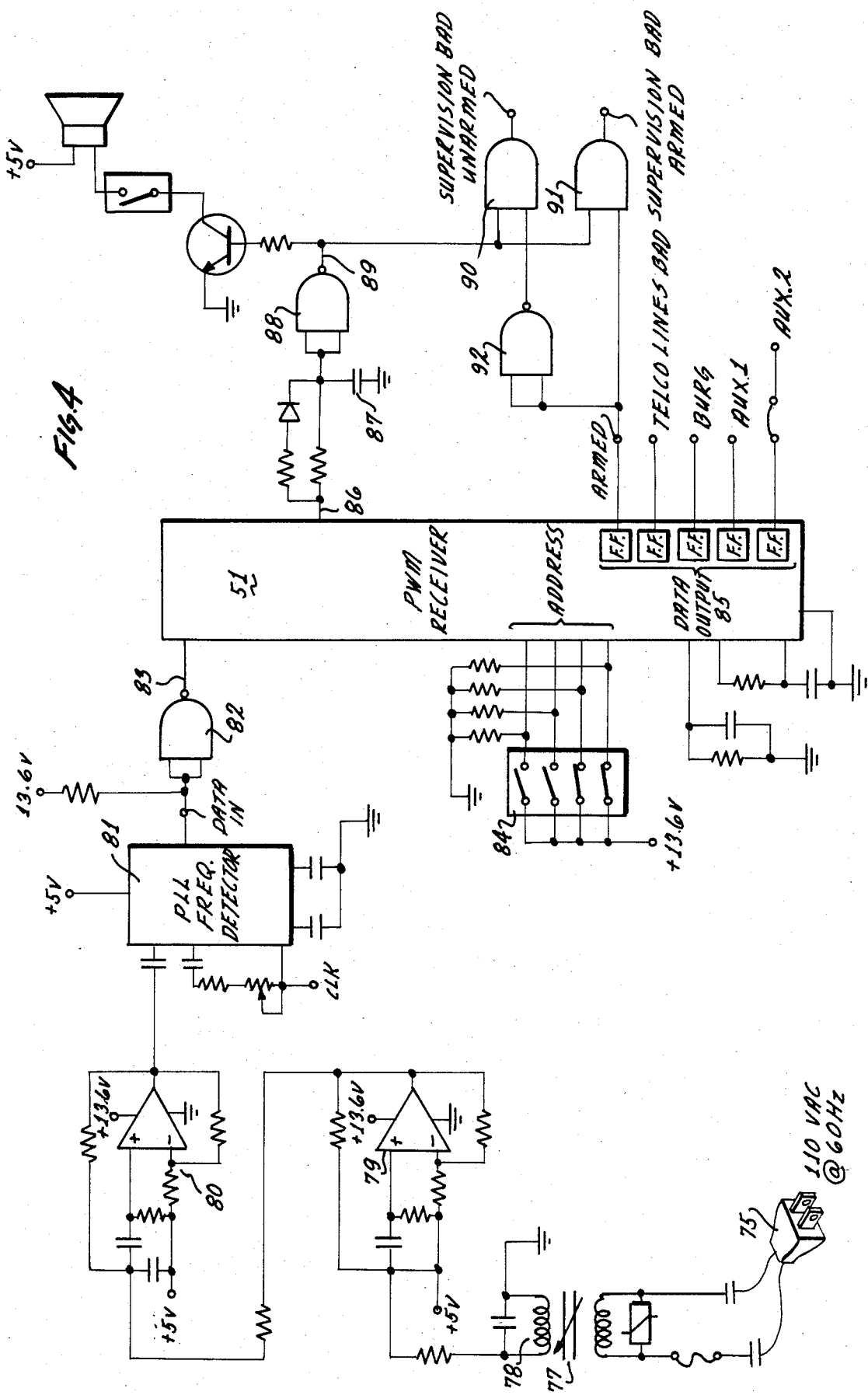
FIG. 4 is a schematic diagram of a PWM receiver and associated circuits as provided in the neighbor's home.

Reference will next be made to FIG. 4 which is a schematic diagram of the PWM receiver circuit 51 as provided at the neighbor's home 50. As seen in FIG. 1, the 60 Hz carrier on the a.c. power lines having the 9-bit word of the PWM 400 KHz sinewave train impressed thereon is fed via the outlet 53 provided in the neighbor's home 50 into a wall plug 75 provided for the PWM receiver 51 in the neighbor's home 50. A coupling transformer 77 tuned to 400 Hz by a tank circuit 78 gets rid of the 60 Hz carrier and feeds the high frequency signals of the PWM 400 KHz sinewave train through first and second stages 79 and 80 of a band pass filter designed to generally pass only the high frequency signals coming within the 400 KHz range.

It should now be clear that the primary purpose of the transformer 77 and band pass filters 79 and 80 is to get rid of the 60 Hz carrier and most of the other high frequency signals including noise that may be superimposed on these a.c. lines.

The signals passed through the stages of band pass filter 79 and 80 may be somewhere between 380 and 420 KHz. These high frequency signals are then passed through a PLL frequency detector 81 which serves to reject everything except the bursts of 400 KHz sinewaves and further serves to convert the bursts back to the digital waveform of the bits of the data word shown in FIG. 3. In other words, when a wide burst of 400 KHz sinewaves is present the digital output is a wide low voltage level pulse and when a narrow burst of 400 KHz sinewaves is present the digital output is a narrow low voltage level pulse. As a result, the digital data bits are inverted relative to the data bits of the original data word. Accordingly, the waveform of the digital data bits is again inverted in the inverter gate 82 before being fed on input line 83 to the PWM receiver 51.

The PWM receiver 51 is initially set to store therein the 4-bit address of the PWM transmitter 24 by manually setting four switches 84 which are connected to provide binary bits to PWM receiver 51. The PWM receiver 51 first senses the first 4 bits of the input digital data word corresponding to the address of the PWM transmitter 24 and if they match with the bits of the address as set in switches 84 the PWM receiver 51 then provides for each of the five bits of data included in the serial digital 9-bit word, namely, ARMED, TELCO LINES BAD, BURG, AUX. 1 and AUX. 2 to be respectively stored in five data latches or flipflops 85 preferably forming a part of the PWM receiver 51. The outputs of these five flipflops provide the respective data outputs of the PWM receiver 51.

It is because of the use of the inclusion of the digital address as a part of the data word transmitted by each of the PWM transmitters that may be in the neighborhood that each PWM receiver 51 avoids getting the wrong information even though the bits of the data word from each of the PWM transmitters in a neighborhood is impressed on the carrier current in the a.c. supply lines at the same frequency of 400 KHz.

In addition to the five data outputs, an output 86 of the PWM receiver 51 is provided that responds to the presence of the high voltage levels of the bits associated with a valid data word which includes the proper address to charge up a capacitor 87 in the circuit connected to the output 86 of the PWM receiver 51. The resulting high voltage level on the input of inverter 88 causes its output 89 to swing to a low voltage level indicative of supervision being good. However, if a bad data address or no data is received during a 60 second period in PWM receiver 51, the capacitor 87 is discharged resulting in the output 89 of inverter 88 swinging to a high voltage level indicative of supervision being bad. Thus the voltage level of the output 89 is indicative of whether the supervision of the security system at the protected home 10 is good or bad, that is, whether the circuit breaker 42 in the home 10, for example, has been opened by a burglar, or generally whether the units of the security system in protected home 10 are plugged-in and operating properly.

Thus, if no data signal is received at output 86 for 60 seconds, i.e., if supervision is bad, as indicated by a resulting high voltage level on the output 89 of the inverter 88, this high voltage level is fed into one input of each of AND gates 90 and 91. Furthermore, when the security system in the protected home 10 is armed, the AND gate 91 receives the high voltage level latched ARMED output signal on its other input, and the output of AND gate 91 is then at a high voltage level to indicate "Supervision Bad Armed". On the other hand, when the security system in protected home 10 is unarmed, i.e., the latched ARMED output signal is at a low voltage level, the inverter 92 inverts the low voltage level signal on the ARMED output and applies it as a high voltage level signal to the other input of AND gate 90 whose output when high in voltage level indicates "Supervision Bad Unarmed". It should now be clearly understood that the latched ARMED output of PWM receiver 51 is not used by itself but is modified to convey either of two levels of "Supervision Bad" information to the central station, namely, "Supervision Bad Armed" or "Supervision Bad Unarmed".

FIG. 5 which is a schematic diagram of the ATC 52 in the neighbor's home 50, shows the output data bits of the PWM receiver 51 being fed into a microprocessor 93 which is programmed for performing the operations of the ATC. Each of these output data bits relating to the status of the security system in the protected home 10 is fed into a separate data bit input of the microprocessor 93. Thus, upon receipt of an output from PWM receiver 51, the microprocessor 93 automatically seizes the set 66 of telephone company lines T and R, i.e., disconnects their connection to lines Rd and Td, respectively, of the telephone 56 in the neighbor's home 50, by actuating the line seizure switches 39 by use of solenoid K1. Moreover, the microprocessor 93 is connected to the telephone company lines T and R by actuating a switch 38 by use of a solenoid K2. The microprocessor 93 then provides for dialing the central station and sending a prerecorded or coded message identifying the protected home 10 and the nature of the fault or emergency help needed therein as indicated by the data bits of the word received by the PWM receiver 51.

In view of the above, if a message is phoned from the neighbor's home 50 into the central station reporting that in the protected home 10 the supervision is bad and that the security system therein is unarmed, which means that it will not report a burglary, the operator at the central station would not call the police because the system was not armed.

On the other hand, if a message is phoned into the central station reporting that in the protected home 10 the supervision is bad and also that the security system therein is armed but the central station does not get a report of a burglary, the operator at the central station would call the police because he could validly assume that a burglar has turned off the circuit breaker 42 at the protected home 10 or otherwise disabled the PWM transmitter 24 and that a burglary is in progress. This is because if the security system in the protected home 10 is armed, it can be concluded that the owner has left the home and therefore only a burglar could have pulled the breaker switch 42 and disconnected the a.c. power lines needed to operate the security system.

Accordingly, providing information as to whether the security system at the protected home 10 is armed or unarmed provides a very high level of security.

Reference will next be made to FIG. 6 which shows conflict avoidance circuit 27 for the PWM transmitter 24 at the protected home 10 which controls the operation of the PWM transmitter 24 and to FIG. 7 which shows waveforms a-f for use in explaining the operation of the conflict avoidance circuit 27.

The present invention provides for each of the protected homes that may be in a neighborhood and connected to the same a.c. power transformer 30 to have a conflict avoidance circuit 27 associated with its PWM transmitter such as PWM transmitter 24 in the protected home 10. Inasmuch as each of these PWM transmitters operates to transmit a 9-bit data word at the same 400 KHz frequency for receipt in a different neighbor's home, this data word must not be transmitted while a data word from another PWM transmitter is present on the a.c. power lines in the neighborhood. Moreover, a data word must not be sent if, by chance, any high frequency electrical signals from any other devices or any high frequency noise may be present on the a.c. power lines.

Thus the conflict avoidance circuit 27 sees to it that at any given time only one PWM transmitter 24 is operating to transmit high frequency signals on the a.c. power lines in the neighborhood.

As previously noted, the 9-bit data word is being transmitted every 5 seconds from a given PWM transmitter 24. Thus, prior to again transmitting the data word, after waiting a 5 second period, the conflict avoidance circuit 27 for this PWM transmitter 24 will, in effect, check the a.c. power lines to determine if any other home in the neighborhood is transmitting data on these lines at this time.

As shown in FIG. 6, the conflict avoidance circuit 27 includes a 5 second timer in the form of a timing flipflop T. The Q output of the timing flipflop T is connected by a resistor R1 and a capacitor C1 in series to ground with a resistor 101 and a diode 102 in series connected in parallel across the resistor R1.

Assume that the TE' output (FIG. 7a) of a Schmitt trigger circuit 76 in FIG. 6 has just switched to a low voltage level as a result of capacitor C2 having charged to a high threshold voltage. As a result, this low voltage level TE' signal present at a control input 28 of the PWM transmitter 24 (FIG. 2) enables it to start to transmit the 9-bit word formed by the address and the data signal inputs into the PWM transmitter 24, on the a.c. supply lines in the neighborhood.

At that instant the timing flipflop T also receives the low voltage level TE' signal on the inverter gate 96 connected to its set input and causes its Q output (FIG. 7c) to switch to a high voltage level and its Q' output (FIG. 7d) to switch to a low voltage level.

As a result, as shown in FIG. 7b, the capacitor C1 starts to slowly charge through resistor R1. In the meantime, the C2 capacitor which was previously charged to a high threshold voltage level to cause the output TE' to switch to a low voltage level now starts to discharge through diode 103 which is forwardly biased due to Q' being at a low voltage level. The PWM transmitter 24 is triggered to start operating in response to the negative going edge of the TE' output and remains operating until capacitor C2 has discharged to cause the TE' output to switch to a high voltage level.

It takes 5 seconds for the capacitor C1 to charge up to a threshold voltage at which it will reset the timing filpflop T, causing the Q output to switch to a low voltage level and the Q' output to switch to a high voltage level. The low voltage level now on output Q causes capacitor C1 to gradually discharge through the now forwardly biased diode 102. With the output Q' at a high voltage level, the diode 103 is now reverse biased enabling capacitor C2 (FIG. 7e) to start to charge up through resistor R2. It takes on the order of 100 milliseconds (ms) for capacitor C2 to charge to a high threshold voltage. As a result, after 100 ms the input 104 of Schmitt trigger circuit 76 is at a high threshold voltage level and the output TE' thereof switches to a low voltage level enabling PWM transmitter 24 to again operate, i.e., to again apply the 9-bit data word to its output 64 and thus impress it as high frequency signals on the a.c. supply lines.

Figure 7:
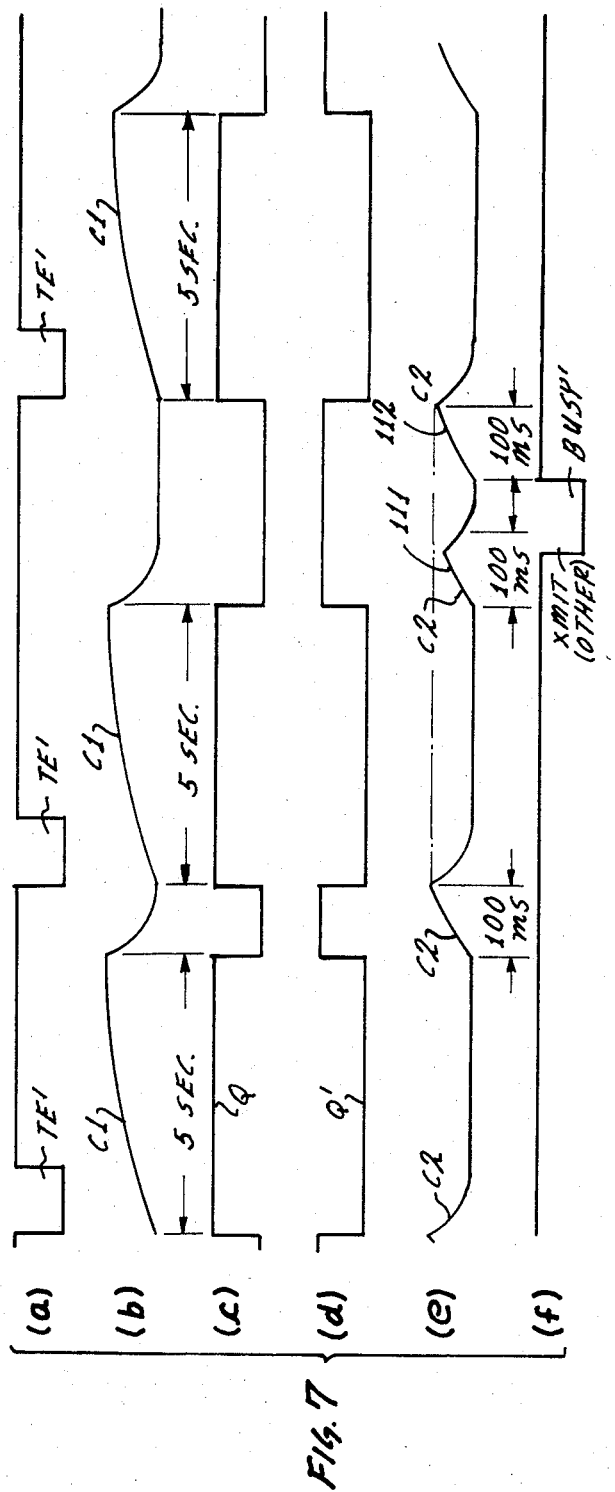
FIG. 7 shows waveforms for use in explaining the operation of the conflict avoidance circuit.

It should now be clear, as shown in FIG. 7, that until the output Q' is at a high voltage level capacitor C2 can now start to charge up through resistor R2. In other words, when output Q' is at a low voltage level it gradually discharges capacitor C2 and then maintains it discharge for the remainder of the 5 second period.

In summary, once the 5 second interval period as provided by the timing flipflop T has expired, the output Q' is switched to a high voltage level and capacitor C2 starts to charge up. As soon as the voltage on capacitor C2 is at a high threshold voltage level, after 100 ms, it switches Schmitt trigger circuit 76 and causes the voltage on TE' to switch to a low level enabling the PWM transmitter 24 of FIG. 2 to start to operate to transmit the 9-bit word on the a.c. power lines.

Now there is another signal that can prevent the capacitor C2 from charging up to a threshold voltage level so as to switch TE' to a low voltage level and thereby enable the PWM transmitter 24 to transmit, and that is the BUSY' signal as provided by the conflict avoidance circuit 27. As shown in FIG. 6, the conflict avoidance circuit 27 is always connected to the a.c. supply lines by being connected across signal points A and B of the wall plug 73 of the PWM transmitter 24 in FIG. 2. Thus, any 400 KHz high frequency electrical signals sensed on the a.c. supply lines while wall plug 73 is inserted in outlet 43 in protected home 10 is fed into the coupling transformer 94 which is tuned to 400 Hz by tank circuit 95 and fed through two stages 97 and 98 of band pass filters identical to the two stages 79 and 80 of band pass filters provided for sensing signals on the a.c. power lines in the PWM receiver 51 in FIG. 4. These signals are then fed into a phase locked loop frequency detector 99 and connected therein to provide at the BUSY' output thereof a digital signal which when at a low voltage level indicates that there is 400 KHz data present on the a.c. supply lines as a result of another PWM transmitter in a home in the neighborhood transmitting signals. This low voltage level BUSY' signal (FIG. 7f) when applied on point 105 of FIG. 6 will immediately start to operate to gradually discharge the C2 capacitor similarly to output Q' when it was at a low voltage level thus preventing the input 104 to the Schmitt trigger circuit 76 from reaching a high threshold voltage level and its output TE' therefore switching to a low voltage level. Note that the conflict avoidance circuit 27 does not decode the high frequency signals on the a.c. power lines at this time, it merely detects whether any signals are present thereon.

Thus once PWM transmitter 24 has waited 5 seconds and is ready to again transmit, its conflict avoidance circuit 27 starts to charge up capacitor C2 which takes on the order of 100 ms. However, until capacitor C2 has charged all the way to the high threshold voltage level, it is not possible for TE' to be switched to a low voltage level so as to enable the PWM transmitter 24 to again transmit. Thus, once the timing flipflop T has flipped such that its output Q' is at a high voltage level, the a.c. supply lines must be free of any data for at least 100 ms as sensed by the conflict avoidance circuit 27 before the PWM transmitter 24 will again be enabled to operate to transmit a data word.

The time for capacitor C2 to charge to a high threshold voltage is not a precise time. It may be as little as 90 ms or as much as 110 ms. Thus in the event that more than one PWM transmitter is waiting to transmit on the a.c. power lines in the neighborhood, one of the PWM transmitters will start to operate by getting its associated capacitor C2 charged to a high threshold voltage before the others and it then takes over.

As previously noted in FIG. 6, the TE' signal upon being inverted in inverter 96 at the set input to the flipflop T becomes a TE signal. Thus, simultaneously with a PWM transmitter starting to operate to transmit high frequency data out on the a.c. supply lines the timing flipflop T is set to a state in which Q is at a high voltage level and Q' is at a low voltage level. Once a PWM transmitter 24 starts to transmit, the BUSY' signals of conflict avoidance circuits for other PWM transmitters in the neighborhood prevent these other PWM transmitters from operating, thereby assuring that the PWM transmitter 24 will be able to finish its transmission without interruption.

Thus, a PWM transmitter that does not get its associated capacitor C2 charged to a high threshold voltage level first will, as a result of its conflict avoidance circuit 27 detecting a BUSY' signal on the a.c. power lines, have its capacitor C2 discharged back down to zero volts as indicated by the C2 waveform 111 in FIG. 7e and will remain discharged until the BUSY' signal disappears. It is in this way that a PWM transmitter avoids the conflict of transmitting a 9-bit data word while another PWM transmitter in the neighborhood is transmitting. Once the low voltage level of BUSY' signal disappears the conflict avoidance circuit 27 tries again to charge capacitor C2 to its high threshold voltage which takes about 100 ms, and if it is successful this time in reaching the high threshold voltage, as indicated by the C2 waveform 112 in FIG. 7e, it will cause TE' to switch to a low voltage level, and thereby enable PWM transmitter 24 to transmit the 9-bit data word as high frequency signals on the a.c. supply lines.

While the foregoing disclosure has been primarily concerned with a particular exemplary embodiment, it is to be understood that the invention is susceptible of many modifications in construction and arrangement. The present invention, therefore, is not to be considered as limited to the specific disclosure provided herein, but is to be considered as including all modifications and variations coming within the scope of the invention as defined in the appended claims.

What is claimed is:

1. A backup security system for the telephone company lines of a protected home located in a neighborhood of individual homes all having external a.c. supply lines connected to a common power transformer and each having individual external telephone company lines, said system comprising:

a line-cut monitor in the protected home for providing a signal when the external telephone company lines for the protected home have been cut;

a transmitter means in the protected home responsive to the signal from the line-cut monitor for providing high frequency electrical signals on the a.c. supply lines; and a receiver means and an automatic telephone communicator located in one of the other homes in the neighborhood selected to serve as a backup home;

said receiver means responding to the high frequency electrical signals on the a.c. supply lines and providing a signal to said automatic telephone communicator to seize the telephone company lines for the backup home and send a message informing a central station that the telephone company lines for the protected home have been cut.

2. A backup security system for the telephone company lines of a protected home located in a neighborhood of individual homes wherein all the homes have external a.c. supply lines connected to a common power transformer and each of the homes has its own external telephone company lines, said system comprising:

a line-cut monitor in the protected home for providing a signal when the external telephone company lines for the protected home have been cut;

an alarm panel in the protected home for providing a signal when an intruder breaks therein;

a transmitter means in the protected home responsive to the signals from the line-cut monitor and the alarm panel for providing high frequency electrical signals on the a.c. supply lines; and a receiver means and an automatic telephone communicator in one of the other homes in the neighborhood selected to serve as a backup home;

said receiver means responding to the high frequency electrical signals on the a.c. supply lines and providing a signal to said automatic telephone communicator to seize the telephone company lines for the backup home and send a message informing a central station that an intruder has broken into the protected home.

3. A backup security system for the telephone company lines of a protected home located in a neighborhood of individual homes wherein all the homes have external a.c. supply lines connected to a common power transformer and each of the homes has its own external telephone company lines, said system comprising:

a sensor means in the protected home for providing a signal when the telephone company lines for the protected home are inoperable;

security means in the protected home for providing a signal when emergency assistance is needed;

a transmitter means in the protected home responsive to the signal from the security measn when the sensor means provides a signal to transmit high frequency electrical signals on the a.c. supply lines; and a receiver means and an automatic telephone communicator located in another home in the neighborhood selected to serve as a backup home;

said receiver means responding to the high frequency electrical signals on the a.c. supply lines and providing a signal to said automatic telephone communicator to seize the telephone company lines for the backup home and send a message informing a central station that emergency assistance is needed in the protected home.

4. A backup security system for the telephone company lines of a protected home located in a neighborhood of individual homes wherein all the homes have external a.c. supply lines connected to a common power transformer and each of the homes has its own external telephone company lines, said system comprising:

a line-cut monitor in the protected home for providing a signal when the telephone company lines for the protected home have become inoperable;

security means in the protected home for generating an alarm signal when the protected home has been broken into by an intruder;

a transmitter means in the protected home;

a gating means responsive to said signal from the line-cut monitor for gating said alarm signal into said transmitter means;

said transmitter means providing for transmitting width modulated bursts of high frequency electrical signals corresponding to an address of said protected home and the alarm signal on said a.c. supply lines; and a receiver means and an automatic telephone communicator in any other home in said neighborhood selected for use as a backup home;

said receiver means storing the address of said protected home; and said receiver means responding to the width modulated bursts of high frequency electrical signals on the a.c. supply lines and when the address stored therein compares with the address of the protected home providing a digital alarm signal on the output thereof;

said automatic telephone communicator responding to the digital alarm signal to seize the telephone company lines for the backup home to send out a message informing a central station that the protected home has been broken into by an intruder.

5. A backup security system for the telephone company lines of a protected home as defined in claim 4 including:

a control circuit means associated with said transmitter means in the protected home for preventing the transmitter means from transmitting any bursts of high frequency electrical signals on the a.c. supply lines in the neighborhood until the a.c. supply lines are clear of any high frequency electrical signals.

6. A backup security system for the telephone company lines of a protected home as defined in claim 4 wherein the security means in the protected home also provides a signal indicating whether it is armed and the armed signal is transmitted by said transmitter means as a burst of high frequency electrical signals on the a. c. supply lines;

wherein the alarm signal and armed signal are stored in latching means provided in said receiver means; and wherein the receiver means in the backup home detects an absence of the receipt of any signals from the transmitter means indicative of supervision being bad in the protected home and combines this information with the armed data in the latching means to provide a supervision bad armed signal or a supervision bad unarmed signal to the automatic telephone communicator.

7. A backup security system for the telephone company lines of a protected home located in a neighborhood as defined in claim 5 wherein said control circuit means includes:

a timing flipflop for use in measuring a fixed time interval;

a first timing capacitor which charges to a level to reset said timing flipflop in said fixed time interval;

a control circuit coupled to the a.c. supply lines to provide a busy indicating signal if any high frequency signals are present thereon;

a threshold inverter circuit;

a threshold capacitor which when charged to a high threshold voltage provides for switching said threshold inverter circuit to a low voltage level which enables said transmitter means to start transmitting said high frequency signals and simultaneously provides for setting said timing flipflop to gradually start charging said first timing capacitor and gradually start discharging said threshold capacitor and holding the latter discharged for said fixed timing interval after which time said first timing capacitor charges to said level to reset said timing flipflop and start charging said threshold capacitor again;

said threshold capacitor prevented from charging to a high threshold voltage by being discharged if a busy indicating signal is sensed by said control circuit prior to reaching said high threshold voltage and remaining discharged until said busy indicating signal disappears.

8. A backup security system for the telephone company lines of each of a plurality of protected homes located in a neighborhood of individual homes wherein all the homes have external a.c. supply lines connected to a common power transformer and each of the individual homes has its own external telephone company lines, said system comprising:

an automatic telephone communicator means and a receiver means located in a backup home provided in the neighborhood for each protected home, each said receiver means storing an address signal of the protected home;

a line-cut monitor in each protected home for providing a signal when the external telephone company lines for the protected home have been cut;

a transmitter means in each protected home responsive to the signal from the line-cut monitor therein for providing electrical signals on the a.c. supply lines, said electrical signals including the address signal of the protected home and the signal from the line-cut monitor;

said receiver means in each said backup home responding to said electrical address signal transmitted on the a.c. supply lines and upon comparison with the address signal stored therein causes the automatic telephone communicator means in said backup home to seize the telephone company lines therefor and send an emergency message to a central station advising that the telephone company lines for the protected home have been cut.

9. A backup security system for a protected home located in a neighborhood of individual homes wherein all the homes have external a.c. supply lines connected to a common power transformer and each of the homes has its own external telephone company lines, said system comprising:

an alarm panel, a first automatic telephone communicator, a line-cut monitor, and a transmitter means at the protected home;

a receiver means and a second automatic telephone communicator at a neighboring home in the neighborhood selected to serve as a backup home;

said line-cut monitor providing a signal when the external telephone company lines at the protected home have been cut;

said alarm panel operable when an intruder breaks into the protected home and the line-cut monitor does not provide a signal indicating the telephone company lines for the protected home have been cut to provide a signal to said first automatic telephone communicator causing it to seize the telephone company lines at the protected home and send a message informing a central station of the intrusion into the protected home;

said alarm panel operable when an intruder breaks into the protected home and line-cut monitor provides a signal indicating the telephone company lines for the protected home have been cut to provide a signal to said transmitter means causing it to transmit high frequency electrical signals on the a.c. supply lines; and said receiver means at the neighboring home responding to the high frequency electrical signals on the a.c. supply lines to provide a signal to said second automatic telephone communicator causing it to seize the telephone company lines at the neighboring home and send a message informing the central station of the intrusion into the protected home.

* * * * *